F. C. MILES.
AUTO ATTACHMENT.
APPLICATION FILED APR. 7, 1921.
1,392,432. Patented Oct. 4, 1921.
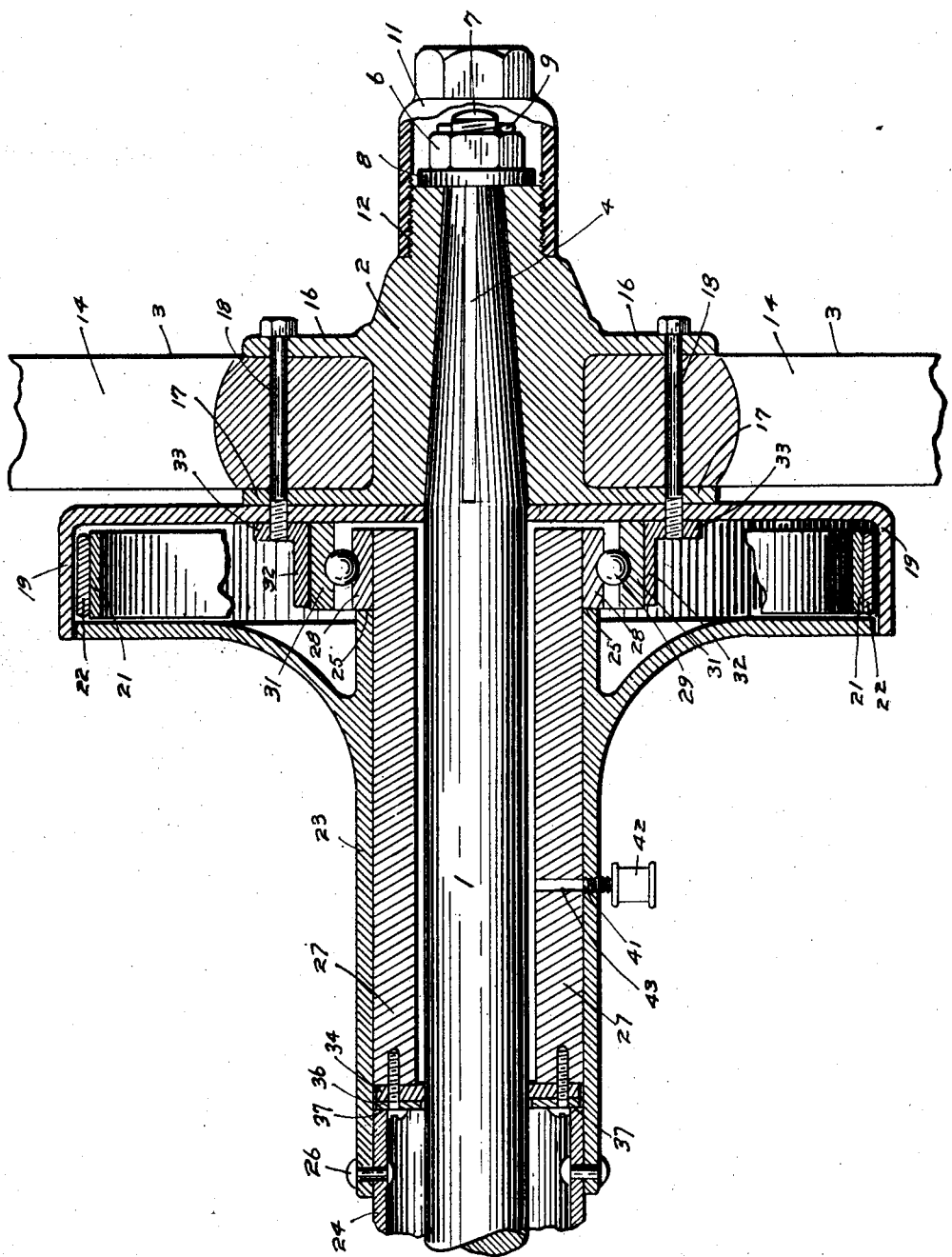
Inventor
FREDERICK C. MILES
By [signature]
Atty

UNITED STATES PATENT OFFICE.

FREDERICK C. MILES, OF SAN FRANCISCO, CALIFORNIA.

AUTO ATTACHMENT.

1,392,432. Specification of Letters Patent. Patented Oct. 4, 1921.

Application filed April 7, 1921. Serial No. 459,361.

*To all whom it may concern:*

Be it known that I, FREDERICK C. MILES, a subject of the King of England, and resident of San Francisco, county of San Francisco, and State of California, have invented a new and useful Auto Attachment, of which the following is a specification.

The present invention relates to improvements in the Ford automobile and its object is to provide an improved bearing means for the rear axle housing of the same. As at present constructed the two ends of the rear axle housing are substantially supported by the axle, a roller bearing and a roller bearing sleeve being interposed at either end near the wheel between the axle proper and the housing so that the weight of the housing rests on the axle. It is the object of the present invention to take the weight of the housing from the axle altogether and have it supported by the wheel through the medium of the brake drum so that the only work to be done by the axle is that of rotating the wheel. Since it happens not infrequently that the rear axle breaks right near one of the wheels due to the weight of the housing and that part of the machine supported by the housing, there is no doubt but what an improvement like the one proposed in this application should add considerably to the desirability and longevity of the car.

I attain my object by means of the mechanism illustrated in the accompanying drawing, which represents a vertical section through the rear hub and that part of the rear axle housing affected by my invention, my special attachment replacing the roller bearing and roller bearing sleeve found between the axle and its housing in the Ford car as now constructed.

Referring to the drawing in detail the reader will see that as in the present day Ford car the rear axle (1) extends from the differential (not shown in the drawing) to the hub (2) of the rear wheel (3) and is keyed to the hub as shown at (4). Hub and axle are held in place relative to each other by the castle nut (6) screwed on a reduced threaded extension (7) of the axle and bearing against the outside of the hub through the washer (8), a cotter pin (9) keeping the nut from working loose. A cap (11) screwed on a threaded portion (12) of the hub incloses the end of the axle. The spokes (14) of the wheel are secured to the hub between the two hub flanges (16) and (17) by means of a plurality of bolts (18) which at the same time secure the brake drum (19) to the wheel as in the present day car. The brake members are shown only in a fragmentary way, because they do not in any way affect my invention. The brake band is indicated at (21) and a lining (22) between the brake band and the brake drum.

The axle housing, as far as shown in the drawing, comprises two parts, one part (23) extending into the brake drum and supporting the brake shoe, while the other part (24) connects the part (23) with the central part of the rear axle housing inclosing the differential. The two parts are riveted together as shown at (26). As at present constructed there are a roller bearing and a sleeve for the same interposed between the axle and the part (23) of the housing, allowing the housing to rest on the axle and allowing the axle to rotate within the housing. I do not use this roller bearing and its sleeve and they are, therefore, not shown in the drawing. The space occupied by the two is largely taken up by the sleeve (27) which fits tightly into the inside of the housing member (23) but has an inner diameter exceeding that of the axle, so that when both are arranged co-axially there is considerable clearance between the axle and the sleeve (27). The sleeve extends from a point in the immediate proximity of the joint between the parts (23) and (24) of the housing to the inside of the brake drum, just clearing its inner surface. Inside of the brake drum it is provided with a collar (28) forming an integral part of the same. This collar bears against the housing as shown at (25) and forms the inner race of a ball bearing (29), the outer race (31) of which is rigidly secured to a flanged ring (32). Its flange (33) is provided with a plurality of perforations registering with the holes through the brake drum, the hub flanges and the wheel, so that the bolts (18) may be extended through the same and the ring thus made an integral part of the latter members and be firmly supported by the same.

At the inner end the sleeve (27) is provided with a grease washer (34) which is secured in place by a metal washer (36), a plurality of set screws (37) extending through said washers into the end of the sleeve. To prevent the washers from working loose I select such as have large heads, so that the heads have to be filed down in order to allow the sleeve to go inside the housing, which effectively locks the set screws.

It will thus be seen that with my attachment the whole weight of the rear axle housing will be supported by the ball bearing (29) which on its part is closely connected to and directly supported by the rear wheel so that the weight is taken off of the rear axle altogether. In practice it will be found necessary to reduce the length of the part (23) of the axle housing so as to leave sufficient room for the collar (28) of the sleeve (27) between the axle housing and the brake drum.

The opening (41) for the grease cup (42) provided on the Ford machine should be extended through the sleeve as shown at (43) so that the grease may be forced between the sleeve and the axle.

I claim:

In means for supporting the rear axle housing of a Ford automobile directly on the rear wheels, a reinforcing sleeve secured to the inside of the housing so as to clear the axle and to extend into the brake drum, a collar on the sleeve within the brake drum, a flanged ring within the brake drum positioned co-axially with the collar having a plurality of perforations in its flange adapted to register with bolts securing the brake drum to the wheel and to be engaged by the bolts, and an anti-friction bearing having the collar and the ring for inner and outer races respectively.

FREDERICK C. MILES.